Dec. 22, 1936.  B. S. AIKMAN  2,065,203
HYDROPNEUMATIC BRAKE
Filed Jan. 30, 1935  4 Sheets—Sheet 1

INVENTOR
BURTON S. AIKMAN.
BY Wm. A. Cady
ATTORNEY

Dec. 22, 1936.   B. S. AIKMAN   2,065,203
HYDROPNEUMATIC BRAKE
Filed Jan. 30, 1935   4 Sheets-Sheet 2

INVENTOR
BURTON S. AIKMAN.
BY
ATTORNEY

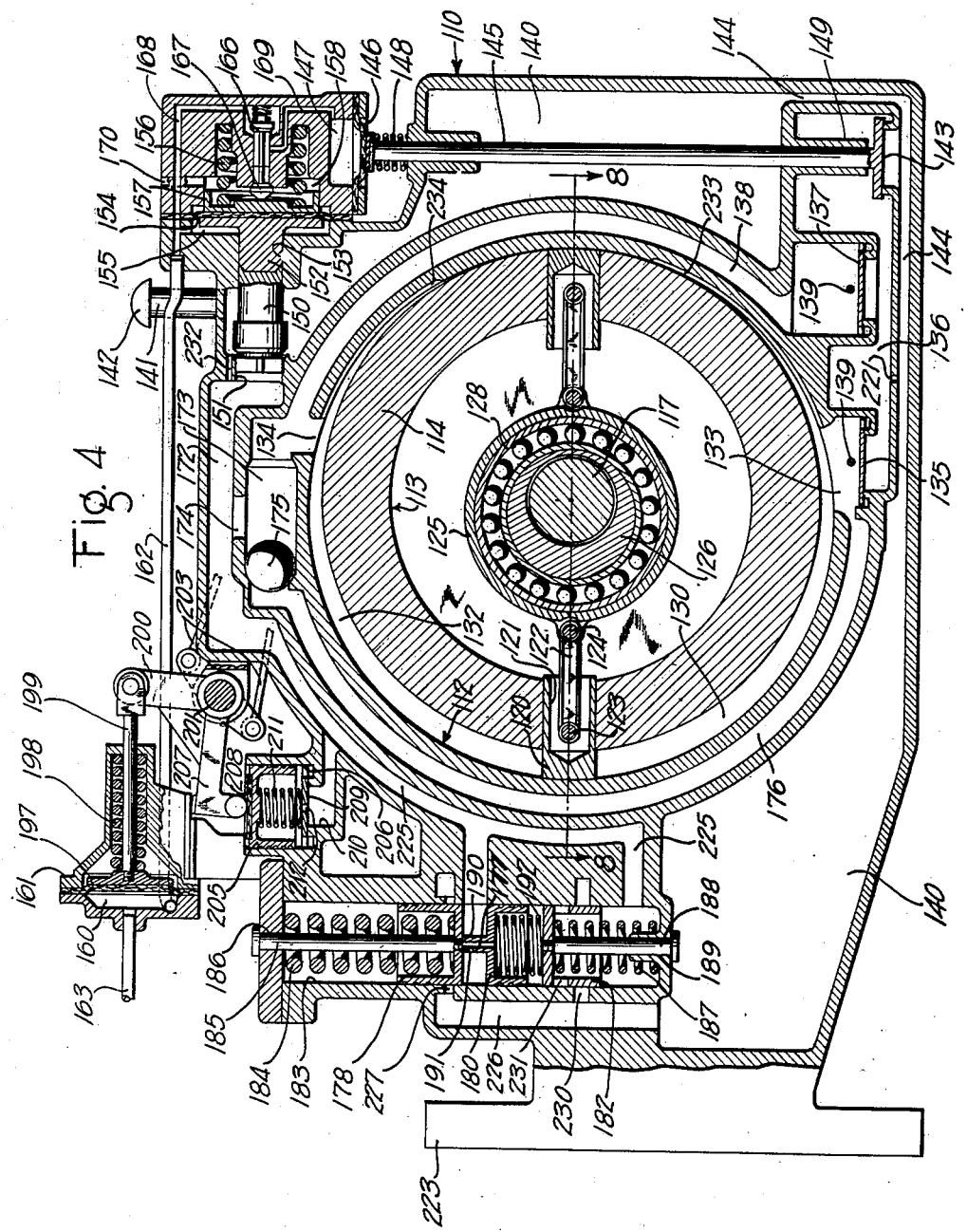

Dec. 22, 1936.   B. S. AIKMAN   2,065,203
HYDROPNEUMATIC BRAKE
Filed Jan. 30, 1935   4 Sheets—Sheet 4
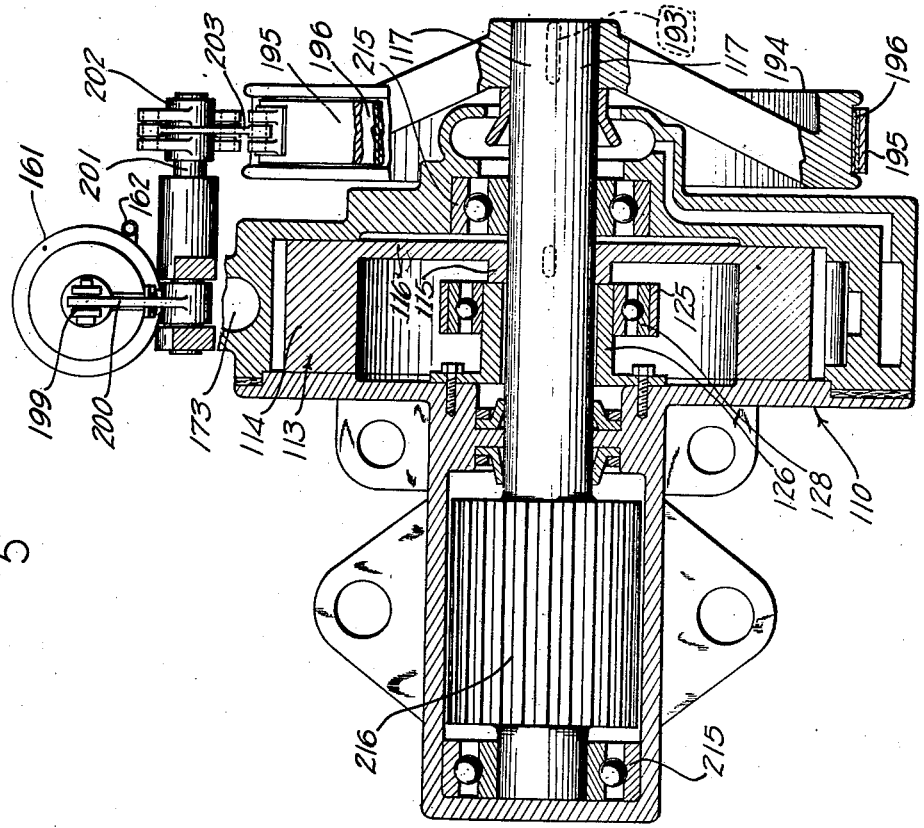
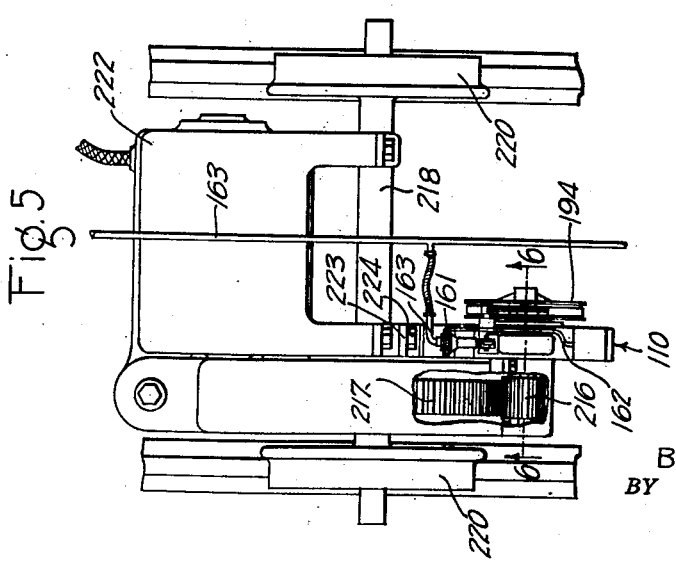
INVENTOR
BURTON S. AIKMAN.
BY
ATTORNEY Patented Dec. 22, 1936

2,065,203

UNITED STATES PATENT OFFICE 2,065,203

HYDROPNEUMATIC BRAKE

Burton S. Aikman, Wilkinsburg, Pa., assignor to The Westinghouse Air Brake Company, Wilmerding, Pa., a corporation of Pennsylvania Application January 30, 1935, Serial No. 4,041

20 Claims. (Cl. 188—90)

This invention relates to hydro-pneumatic brakes, and more particularly to hydro-pneumatic brake systems for all types of vehicles and in particular for railway vehicles and trains.

When railway vehicles and trains are operated at high speeds, as for example in the neighborhood of 100 miles per hour or more, considerable energy must be dissipated by the brakes when they are applied to bring the vehicle or train to a stop. If friction type brakes are employed, the brakes must be initially applied with a high degree of braking force, because the coefficient of friction between the rubbing parts of a friction brake is lower at the high speeds than at the low speeds, and must be reduced as the speed of the vehicle or train diminishes and the coefficient of friction increases, or otherwise the braking effect on the wheels may exceed that permitted by the adhesion between the wheels and track rails and thereby cause the wheels to slide.

Where the friction brake employed consists of brake shoes rubbing against the treads of the vehicle wheels it has been found that in braking vehicles and trains from high speeds considerable heat is generated, which reduces the braking effect, and considerable wear takes place, which necessitates the frequent renewal of the brake shoes. This of course increases the cost of maintenance and requires more frequent inspections.

To more adequately meet the requirements for braking high speed trains and to overcome some of the difficulties encountered with friction type brakes, various electric braking systems have been heretofore proposed. A principal advantage of the most important of these electric systems, as for example the regenerative, dynamic, or eddy current brake systems, is that they are more effective at the high speeds and can be designed to produce a substantially constant braking force over the greater part of the deceleration period. Toward the end of the deceleration period however the effectiveness of these electric brake systems begins to decrease, first slowly and then rapidly, until at zero speed of the vehicle the electrical braking effect is zero. A friction brake must therefore be employed at the end of the deceleration period to insure that the vehicle or train will be brought to a stop and to hold it at rest.

In both the friction brake and electric brake systems energy must be supplied from a source provided for that purpose. That is, if the friction brake is operated by fluid under pressure, energy must be provided in the form of a compressed fluid, while with the electric brake system electrical energy must be supplied to energize the electric brake devices. Since the vehicle or train to be braked has considerable energy stored in its mass while running at high speeds, it would be desirable if this energy could be employed to brake the vehicle or train to a stop.

It is a principal object of the present invention to provide a hydro-pneumatic brake system in which the motion of a vehicle or train is retarded due to its own momentum, that is, the energy stored in the moving mass of the vehicle or train is employed to brake the vehicle or train.

Another object of the invention is to provide a hydro-pneumatic brake operating according to the above principle, in which the degree of braking effect is controllable according to well known principles and methods now employed.

A further object of the invention is to provide a brake system of this character in which the characteristics of the braking devices are such that a substantially constant rate of retardation is maintained over practically the entire deceleration period for each degree of application of the brakes, and such that the rate of retardation tapers off to zero at the end of the deceleration period, so that a smooth stop free of violent shock results.

A still further object of the invention is to provide a hydro-pneumatic brake device which is inherently operable to prevent sliding of the vehicle wheels.

Yet another object of the invention is to provide a hydro-pneumatic brake system in which the maximum degree of braking is limited only by the adhesion between the vehicle wheels and track rails.

Yet another object of the invention is to provide a hydro-pneumatic brake device which is equally effective for either direction of travel of the vehicle.

A still further object is to provide a hydro-pneumatic brake system in which a failure or partial failure of the pneumatic control results automatically in an application of the brakes.

Yet another object is to provide a brake system which eliminates the excessive heating, and the wear incident thereto, resulting from the rubbing of frictionally engaging parts.

A still further object is to provide a hydro-pneumatic brake device which can be manufactured at low cost, which requires a minimum of servicing and low upkeep, and which requires no periodic adjusting.

Still another object of the invention is to provide a combined hydro-pneumatic and friction brake system in which the friction brake is prevented from being applied so long as the hydro-pneumatic brake is applied, but which is cut into action when the effectiveness of the hydro-pneumatic brake decreases below a predetermined value.

Still further and more specific objects relating to specific constructions and arrangements of parts will be obvious from the following description, which is taken in connection with the attached drawings, wherein Figure 1 is a view depicting diagrammatically an elementary form which the invention may take.

Figure 4 is a view diagrammatically showing a more advanced form of the invention.

Figure 5 is a schematic view showing how the form of the invention depicted in Figure 4 may be adapted to a motor driven vehicle axle.

Figure 6 is a partial sectional view of this form of the invention taken along the line 6—6 of the Figure 5.

Figure 8:
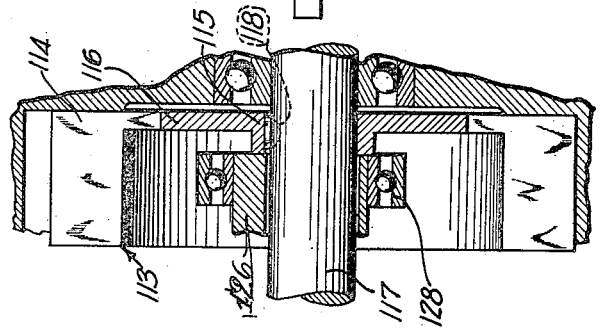
Figure 7:
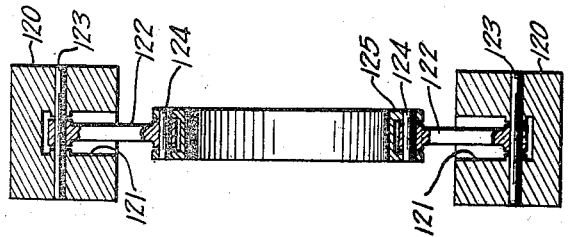

Figures 7 and 8, taken together, represent a telescopic view of parts of the advanced form of the invention, taken along the line 8—8 of Figure 4. When Figure 7 is telescoped with Figure 8 the parts are in their normal assembled relation.

Figure 1:
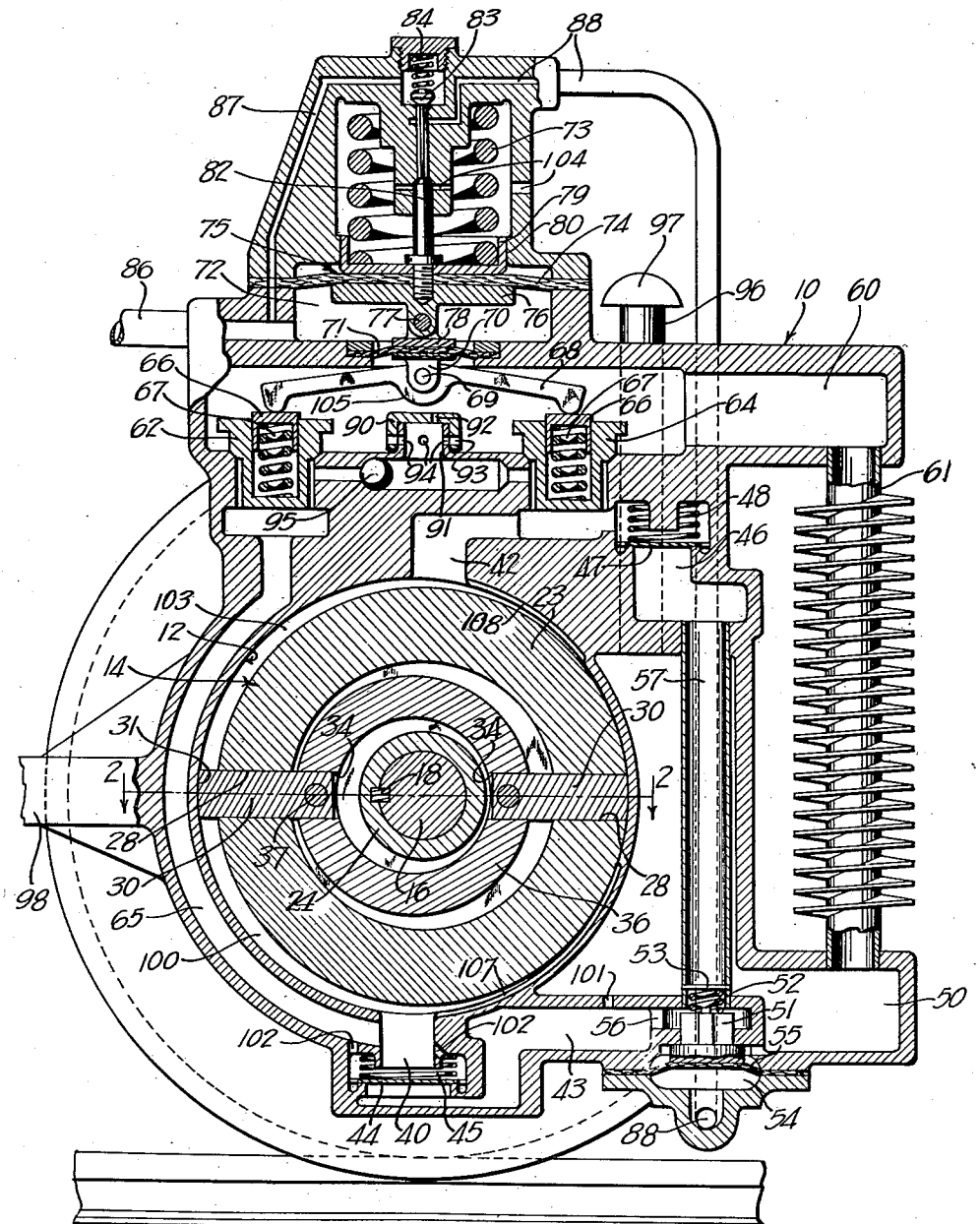
Figure 2:
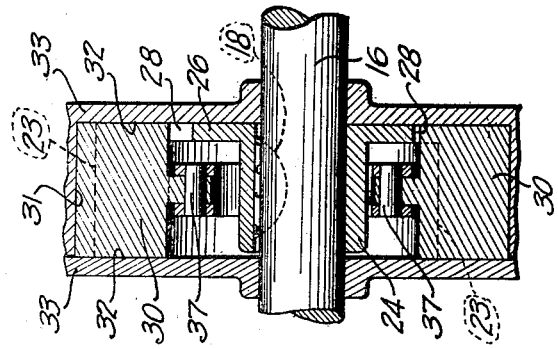
Figure 2 is a partial sectional view taken along the line 2—2 of Figure 1.
Figure 3:
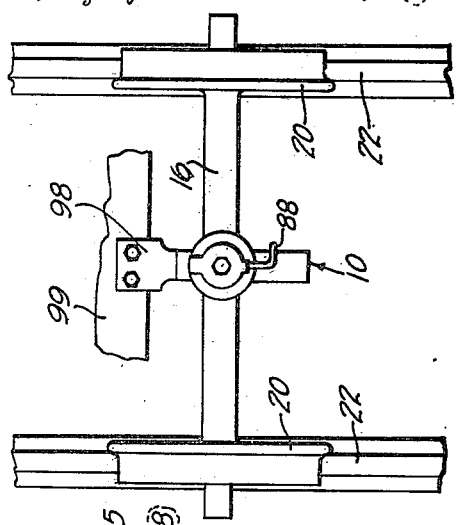
Figure 3 is a view showing an adaptation of the device of Figure 1 to the axle of a railway vehicle.

Referring now to Figures 1, 2, and 3, which show the first embodiment of the invention, the hydro-pneumatic brake device is embodied in a casing 10 provided with a circular cylinder 12 in which is rotatably disposed a rotor 14 rigidly secured to a shaft or axle 16, as by a key 18. The shaft or axle 16 may form the axle for two vehicle wheels 20, which are rigidly secured to the axle and rotatable therewith. The wheels will of course roll on track rails 22, and when there is no slip between the wheels and rails the rotor 14 will be rotated at a speed corresponding to the speed of the vehicle with which the wheels are associated.

The rotor 14 is secured to the shaft 16 in a manner such that its periphery rotates concentric to the shaft, while the periphery of the cylinder 12 is eccentric to the shaft. As will more clearly be seen from Figure 2, the outer or annular portion 23 of the rotor 14 is joined to the hub portion 24 by a spider portion 26. Both the annular and spider portions of the rotor are provided with diametrically opposed slots 28 for receiving blades or vanes 30 adapted to provide a seal between the rotor and cylinder.

The outermost edge 31 of each vane or blade 30 is shaped to conform to the inner contour of the cylinder 12, and radial edges 32 are similarly adapted to fit snugly against the side walls 33 defining the cylinder. The inner ends of the two blades 30 project into slots or recesses 34 of a ring 36, which is freely disposed within the annular portion 23 of the rotor 14. Each blade 30 may be secured to the ring 36 by means of a pin 37 or by any other suitable means. The blades 30 are secured to the ring 36 in a manner such that the outer edges 31 press snugly against the cylinder walls, and as the rotor 14 rotates the ring 36 rotates eccentric to the shaft 16.

At the bottom of the cylinder 12 is a lower cylinder port 40 and at the top of the cylinder is a similar upper cylinder port 42. These ports have an axial dimension preferably less than that of the cylinder 12, so that when the rotor 14 is rotated the edges 31 of the blades 30 readily pass over the ports.

For controlling communication between a supply chamber 43 and the lower port 40, there is provided a check valve 44, urged toward a seated position by a spring 45. For controlling communication between another supply chamber 46 and the upper port 42, there is provided a check valve 47 urged toward seated position by a spring 48.

For controlling communication between the two supply chambers 43 and 46 and a fluid supply reservoir 50 in the casing 10, there is provided a cut-off valve 51. The cut-off valve 51 is urged toward unseated position by a spring 52 reacting against a pin 53, and may be urged toward seated position by the supply of fluid under pressure to a chamber 54 below a diaphragm 55, which contacts the valve 51 when deflected upwardly, to seat the valve.

When the valve 51 is unseated, a communication is established between the fluid reservoir 50 and the supply chamber 43, past the unseated valve 51, and through an opening 56. In a similar manner a communication is established between the fluid reservoir 50 and the supply chamber 46, past the unseated valve 51, through a duct 57.

In the upper part of the casing 10 there is provided a discharge chamber 60, which is in communication with the fluid reservoir 50 through one or more cooling coils 61. For controlling communication between the discharge chamber 60 and the lower cylinder port 40, there is provided a left hand discharge valve 62, and for controlling communication between the discharge chamber 60 and the upper cylinder port 42, there is provided a second discharge valve 64. The lower cylinder port 40 is in communication with the valve chamber below valve 62 by way of passage 65, while the upper cylinder port 42 terminates in the valve chamber below the discharge valve 64.

Each discharge valve is prvided with a slidable abutment 66, which when moved inwardly of the valve compresses a spring 67. When the slidable abutment 66 in each valve is actuated inwardly of the valve the spring 67 is compressed and each discharge valve 62 and 64 is held seated with a pressure corresponding to the tension on the spring 67.

For actuating the two abutments 66 inwardly of the two discharge valves there is provided a mechanism including a lever 68 pivotally mounted intermediate its ends at 69 to a lug 70 secured to a diaphragm 71 providing a seal between the discharge chamber 60 and a brake pipe chamber 72. One end of the lever 68 is adapted to engage the slidable abutment 66 in the right hand discharge valve 64, while the other end of the lever is adapted to engage the slidable member 66 in the left hand discharge valve 62.

For actuating the lever 68 there is provided a diaphragm arrangement 75 subject on one side to pressure of fluid in the brake pipe chamber 72 and subject on the other side to pressure of a heavy spring 73. The diaphragm arrangement 75 comprises a diaphragm 74 suitably mounted in the casing 10 to define with the casing the brake pipe chamber 72, and having secured to the under side thereof a plate member 76 pivotally secured at 77 to a lug 78 in turn secured to the aforementioned diaphragm 71. Secured to the upper side of the diaphragm 74 is a guiding spring cup 79 slidable in a bore 80 and receiving one end of the heavy spring 73.

For controlling the pressure in the aforementioned cut-off valve chamber 54, there is also provided secured to the diaphragm 74 a release valve 82 and a separate supply valve 83, preferably held in abutting relationship by a spring 84, which urges the supply valve toward seated position and the release valve 82 toward unseated position. When the diaphragm 74 is actuated upwardly the release valve is actuated to seated position and the supply valve to unseated position.

The brake pipe chamber 72 is in constant communication with a brake pipe 86, which brake pipe is to be understood as being that which extends throughout a train and normally maintained charged with fluid under pressure. When the brake pipe is thus charged the pressure in the brake pipe chamber 72 will correspond to brake pipe pressure, and the diaphragm 74 will be held in its uppermost position. At the same time, fluid under pressure is supplied from the brake pipe to the cut-off valve chamber 54, by way of passage 87, past the unseated supply valve 83, and through pipe and passage 88. The pressure of fluid thus supplied to chamber 54 will hold the cut-off valve 51 in seated position.

For providing a by-pass communication between the two cylinder ports 40 and 42 and the discharge chamber 60, there is provided a pressure operated graduating by-pass valve 90, of the sleeve type, disposed in telescopic and non-rotative relation with an inside sleeve or flange 91. The graduating by-pass valve 90 is provided with one or more constantly open restricted ports 92, and one or more graduating ports 93, which latter ports are adapted to fully register with similar ports 94 in the inner sleeve member 91 when the valve 90 is in its lowermost position.

Communication between the discharge chamber 60 and either of the cylinder ports 40 and 42 is made selective by the intervention of a ball check valve 95. When the ball check valve 95 is in its left hand position, as shown in Figure 1, communication is established between the discharge chamber 60 and the upper cylinder port 42, by way of the graduating by-pass valve, and when the ball check valve 95 is in its right hand position, communication is established between the discharge chamber 60 and the lower cylinder port 40, as will be obvious from the passages shown in Figure 1.

It will be noted however that the size of the communication between the discharge chamber 60 and either of the cylinder ports depends upon the position of the graduating by-pass valve 90. When this valve is in its uppermost position, ports 93 and 94 are out of register, and communication is solely by way of the restricted port 92. For positions of the by-pass valve 90 between its extreme upper and lower positions, the ports 93 and 94 will be partly in registration, so that various degrees of communication are afforded.

Access to the fluid reservoir 50 from outside the casing 10 may be had through a combined filling and vent plug 96. This plug is provided with a cap 97 which fits over the plug in such a manner as to prevent dust and foreign matter from entering the reservoir 50, but provides for free passage of air into the reservoir 50.

When the brake device is associated with a vehicle axle, as shown in Figure 3, a bracket portion 98 of the casing may be secured to any part 99 of the axle truck so that the casing 10 is maintained rigid while the axle 16 is rotating.

The operation of this embodiment of my invention is as follows:

When the brake device is mounted as shown in Figure 3 and the brake pipe 86 is maintained charged, the parts of the brake device will be in the positions shown in Figure 1. When the vehicle is running the axle 16 and rotor 14 will be rotating at a speed corresponding to the speed of the vehicle. The fluid reservoir 50 is maintained filled to a predetermined level with a suitable fluid, as for example oil of the type commonly employed in connection with the lubrication of automobile engines and the like.

Assuming the axle 16 and rotor 14 to be rotating in a clockwise direction, sufficient suction will be produced in the chamber 100 defined by the rotor 14, the blades 30 and the cylinder 12, to cause check valve 44 to overcome the pressure of spring 45 and unseat to permit oil to flow from the reservoir 50 through a by-pass port 101, chamber 43, past the unseated valve 44, through ports 102, and lower cylinder port 40, to chamber 100. As the rotor 14 rotates through an angle of 180 degrees from the position shown in Figure 1, the chamber 100 will occupy the space now occupied by chamber 103, and this volume thereafter will be decreased as the rotor continues to rotate and the oil in the chamber will be forced through the upper cylinder port 42 to the valve chamber below discharge valve 64.

Since the valve 47 will be even more firmly held seated by this pressure, the oil flows from the valve chamber to the discharge chamber 60 through the ports 92, 93, and 94 of the graduating by-pass valve 90, the pressure of the oil being insufficient to raise the by-pass valve to its upper position. The by-pass port 101 is made just large enough to insure that only enough oil passes into the cylinder 12 to adequately lubricate the surfaces between the moving and stationary parts. There is therefore no back pressure built up to retard motion of the rotor, and the brake device may therefore be said to be in release position.

If now it is desired to effect a service application of the brakes, the brake pipe pressure is reduced by any one of the commonly known methods, to a degree in accordance with the desired degree of braking. When the brake pipe pressure is thus reduced, the pressure in chamber 72 accordingly reduces and diaphragm 74 moves to a lower position where the pressures on either side thereof are in balance. For the smallest brake pipe reduction which can be made, the release valve 82 will be unseated and the supply valve 83 seated, so that the supply of fluid under pressure from the brake pipe to the cut-off valve chamber 54 is cut off and the pressure in this chamber released to the atmosphere, past the unseated relase valve, and through port 104.

The cut-off valve 51 is therefore caused to be unseated by spring 52, and an unrestricted flow of oil may take place from the reservoir 50 to the lower cylinder port 40. Therefore, as the rotor 14 rotates each of chambers 100 and 103 will be filled with oil when in their lowermost position, that is, when adjacent lower cylinder port 40, and since the oil is a relatively incompressible medium a back pressure will be exerted on the rotor when the chambers are rotated to their uppermost position and the oil discharged into and fills the volumes connected to the upper cylinder port 42.

This back pressure will cause the graduating by-pass valve 90 to be moved upwardly until it engages the lower edge 105 of the fulcrum point of the lever 68, in which position the ports 93 and 94 will be only partly in registration. Only a small amount of oil can then pass through the by-pass valve ports to discharge chamber 60. The pressure exerted on the oil will therefore react principally against the lower area of discharge valve 64 within its seat, and when the pressure acting below the valve is sufficient to overbalance the pressure acting down upon the valve from lever 68, due to the reduction in brake pipe pressure, the discharge valve will unseat and permit the flow of oil to the discharge chamber 60.

The pressure exerted downwardly upon the discharge valve 64 depends upon the compression of its spring 67, which in turn corresponds to the reduction in brake pipe pressure. Therefore, the discharge valve 64 will unseat an amount sufficient to maintain a back pressure on the rotor 14 corresponding to the reduction in brake pipe pressure. Now it will be obvious that the back pressure exerted on the rotor 14 in turn exerts a braking torque on the vehicle wheels 20, so that the braking effect on the wheels is in proportion to brake pipe reduction.

In order that all of the oil entering either of the chambers 100 or 103 from one of the cylinder ports 40 or 42 shall be discharged through the other cylinder port, slip grooves 107 and 108 have been provided. From the manner in which these slip grooves have been shown in Fig. 1, it will be obvious that as the oil is forced out through the cylinder port adjacent a groove the groove functions to prevent trapping of oil in the space forward of the port.

As the oil flows past the unseated discharge valve 64 to the discharge chamber 60, it returns to the main reservoir 50 through the cooling coil or coils 61, where the heat absorbed during its passage through the cylinder 12 is liberated to the atmosphere.

During the operation just described, the ball check valve 95 assumes a position to the left, as shown in Figure 1, as there is no pressure from the left on this ball check valve, due to the fact that the left hand discharge valve 62 is not subject to the back pressure exerted by the fluid passing through the cylinder 12 when the rotor is rotating in a clockwise direction.

When it is desired to effect a release of the brakes, the brake pipe pressure is restored in the usual manner, whereupon the diaphragm 74 moves to its uppermost position, where release valve 82 is seated and supply valve 83 unseated. Fluid under pressure is then supplied from the brake pipe to the cut-off valve chamber 54, causing the cut-off valve 51 to be seated to cut off the flow of oil from the reservoir 50 to the lower cylinder port 49. Since the flow of oil to the cylinder 12 is cut off, except for that which flows through the restricted port 101 for lubrication purposes, the braking effect produced diminishes to zero. Of course as the diaphragm 74 moves to its uppermost position, the load on the two discharge valves 64 and 62 is decreased to zero or its release value, and the lubricating oil passing through the cylinder 12 returns by way of the graduating by-pass valve 90, as heretofore described.

If it is desired to effect a graduated or partial release the brake pipe pressure may be increased in the manner commonly employed in standard fluid pressure brake systems, and the braking effect will accordingly be reduced.

When it is desired to effect an emergency application of the brakes, the brake pipe pressure is reduced to a low emergency value, as is common practice, whereupon the diaphragm 74 moves to its extreme lowermost position. In this position the discharge valve springs 67 are compressed to a maximum degree, and the graduating by-pass valve 90 held in its lowermost position by engagement of the lever lug 105 therewith. If the vehicle speed is high, then when the discharge valves 62 and 64 are thus heavily loaded, the flow capacity of the discharge valve 64 may not be sufficient to prevent excessive back pressures from being built up in the rotor 14, and the rotor may become locked and sliding of the wheels thus caused.

However, with the graduating by-pass valve 90 held in its extreme lowermost position, a by-pass communication is formed large enough to permit oil to pass to the discharge chamber 60 at a rate such that the back pressure will be insufficient to cause locking of the rotor 14. Nevertheless, so long as the vehicle wheels keep rolling the back pressure will be ultimately regulated by the load on the discarge valve 64, so that the braking effect produced will be a maximum and great enough to make an emergency stop.

If during either a service or an emergency application of the brakes, the vehicle wheels should pass from a dry rail on to a slippery rail, the adhesion between wheels and rails will immediately diminish and may be insufficient to permit the degree of application with which the brakes were applied. The vehicle wheels will then begin to decrease in speed below that corresponding to the speed of the vehicle, and correspondingly the back pressure on the rotor 14 will decrease.

The decrease in speed will take place until a balance is found between the back pressure on the rotor and the braking torque permitted by the then existing adhesion between wheels and rails. While this speed may be greatly below that corresponding to the speed of the vehicle, and while the wheel speed may fluctuate between an upper limit and a lower limit, the braking effect produced is that due to rolling wheels rather than that due to sliding wheels, which would be much less. In other words, the wheels may slip on the rails but will not slide. The brake device is therefore inherently self-preventing against sliding of the wheels.

If a brake pipe reduction is made and no further change in brake pipe pressure takes place, as the vehicle speed diminishes the pressure exerted on the oil by the rotor 14 decreases. The discharge valve 64 then moves toward seated position to maintain the oil pressure substantially constant, the braking effect produced by the brake device will remain substantially constant so long as all wheels roll at normal speed, and the vehicle will be decelerated at a substantially constant rate of retardation.

As the speed of the vehicle diminishes a low speed will be reached at which the pressure exerted on the oil is insufficient to hold the discharge valve 64 unseated, and the by-pass communication through the graduating by-pass valve 90 will thereafter wholly control flow of the oil to the discharge chamber and the back pressure on the rotor is governed by the size of this open communication. As the speed decreases further, the back pressure on the rotor will decrease, until at zero there will be no back pressure on the rotor. It will therefore be obvious, that the braking effect will be substantially constant over the greater part of the deceleration period, until at the very end the braking effect will taper off to zero, permitting the vehicle to be brought to a stop smoothly and without shock.

If now the axle 16 and rotor 14 are rotating in a counter-clockwise direction, the operation will be substantially as before described for clockwise rotation, except that oil will flow past the cut-off valve 51, when unseated, through the duct 57, past the valve 47, which will unseat due to the suction created in either chamber 100 or 103, and from thence through the upper cylinder port 42 to the adjacent chamber. As the adjacent chamber passes toward the lower cylinder port 40, the oil will flow through this port, through passage 65, to the valve chamber below the left hand discharge valve 62, where it will act to unseat this discharge valve, in the same manner as before described for discharge valve 64.

At the same time, ball check valve 95 will be forced to its extreme right hand position, and the graduating by-pass valve 90 will function in the same manner as before described. It will be noted that no adjustments or change-over mechanisms need be operated when the direction of rotation is changed, but the brake device is inherently operable for both directions of travel, the effectiveness of the brake device being the same for either direction.

Considering now Figures 4 to 8 of the drawings, which show the second embodiment of the invention, this embodiment includes an improved form of the hydro-pneumatic brake device associated with a band type friction brake device.

The hydro-pneumatic brake device is embodied in a casing provided with a circular cylinder 112 in which is disposed a rotor 113 having an annular portion 114 joined to a hub portion 115 by a spider portion 116. The hub portion 115 is rigidly secured to an axle or shaft 117, as by a key 118. The periphery of the rotor 113 is concentric to the shaft or axle 117, while the inner periphery of the cylinder 112 is eccentric to the shaft.

The rotor 113 is provided with blades or vanes 120, similar to those described in connection with the embodiment of Figure 1, and are provided for the same purpose. The blades 120 are however each hollowed out as shown at 121 to receive a connecting rod 122, which is pivotally secured to the blade by a wrist pin 123, in the manner commonly employed in connection with internal combustion engine systems. The other end of each connecting rod 122 is similarly connected through another wrist pin 124 to a ring member 125 disposed on a stationary flange member 126 secured to a side wall of the cylinder 112. As the rotor 113 rotates, the ring 125 is carried therewith and overruns the flange member 126 through the medium of a ball bearing 128.

The blades 120 cooperate with the rotor and cylinder to define two chambers 130 and 132, as described for the embodiment of Figure 1. A lower cylinder port 133 is provided for the flow of oil to or from the cylinder 112 and an upper cylinder port 134 is also provided for a like purpose. An inlet check valve 135 controls communication between the lower cylinder port 133 and a supply chamber 136. A similar inlet check valve 137 controls communication between the supply chamber 136 and the upper cylinder port 134, the communication including a passage 138. A pin 139 is disposed across each of the inlet valves 135 and 137 for the purpose of limiting the opening movement of each valve.

The casing 110 is also provided with a main fluid reservoir 140, to which access may be had through a filling and vent plug 141 provided with a venting cap 142. A cut-off valve 143 controls communication between the fluid reservoir 140 and the supply chamber 136, by way of a passage 144. The cut-off valve 143 has a stem 145, the upper end of which is secured to a diaphragm 146, which is subject to fluid pressure from a chamber 147. A spring 148 acts upon the diaphragm 146 to urge the cut-off valve 143 toward unseated position, the amount which the valve can be unseated being limited by a sleeve 149.

Disposed in an upper part of the casing 110 is a discharge valve 150, which coacts with a seat 151 to control the back pressure exerted on the rotor 113 when fluid is permitted to freely flow to the chambers 130 and 132 from the reservoir 140. The discharge valve 150 has a stem abutting a lug 152 slidably disposed in a bore 153 in the casing. The lug 152 is secured to a diaphragm 154 subject on one side to pressure from a brake pipe chamber 155 and subject on the other side to pressure from a heavy spring 156. One end of the spring 156 bears against a guiding spring cup 157, which slides in a cylinder-like chamber 158.

The brake pipe chamber 155 is in communication with a chamber 160 in a brake cylinder 161 by means of pipe 162. The brake cylinder chamber 160 is connected to train brake pipe 163, so that when the brake pipe is charged the brake cylinder chamber 160 and brake pipe chamber 155 are maintained at brake pipe pressure.

When the chamber 155 is thus maintained at brake pipe pressure, the diaphragm 154 is urged to its extreme right hand position, where discharge valve 150 may unseat and a supply valve 166 is held unseated and a release valve 167 is held seated. Unseating of the supply valve 166 establishes a communication between the aforementioned cut-off valve chamber 147 and the brake pipe chamber 155, by way of passage 168, past the unseated supply valve 166, and through passage 169. The pressure of fluid supplied to chamber 147 acts on diaphragm 146 to seat valve 143. When the pressure in chamber 155 is reduced, diaphragm 154 moves to the left, thereby seating supply valve 166 and unseating release valve 167. The supply of fluid under pressure to the chamber 147 is thus cut off and the pressure in this chamber released to the atmosphere, past the unseated release valve 167 and through an exhaust port 170. Spring 148 then unseats valve 143.

The discharge valve 150 controls the flow of oil from a discharge chamber 172 to the reservoir 140. Communication from the upper cylinder port 134 to the discharge chamber 172 is by way of ball check valve chamber 173 and port 174 with ball check valve 175 in the position shown in Figure 4. Communication from the lower cylinder port 133 to the chamber 172 is by way of passage 176, ball check valve chamber 173 when the ball check valve 175 is to the right, and port 174.

For controlling the pressure of the oil in the chamber 172 for heavy brake applications and for unloading the brake device quickly during slipping of the wheels, there is provided a mechanism, shown to the left of Figure 4, including a piston valve 178, an underspeed release piston 180 and an underspeed release piston valve 182, all of which are disposed in a piston chamber 183. The piston valve 178 is urged downwardly by a spring 184 concentric to a valve stem 185 having one end secured to the piston valve 178 and the other end slidable in a bore 186 in the casing.

The underspeed release valve 182 is urged upwardly by a spring 187 concentric to a valve stem 188 having one end secured to the valve 182 and the other end slidable in a bore 189 in a lower part of the casing.

The underspeed release piston 180 is disposed between the two valves 178 and 182 and has a stem 190 projecting upwardly therefrom and adapted to engage the pressure release valve 178. The stem 190 is apertured therethrough at 177 so that communication may be established between the volumes above and below the piston when the piston is out of engagement with the valve 178. A reset port 191 forms a restricted communication between the aperture 177 through the stem 190 and the space above the piston 180. Interposed between the under side of the piston 180 and the upper side of the underspeed release valve 182 is a spring 192.

When the brake device is in release position, the position of the parts of this pressure release and underspeed release mechanism are as shown in Figure 4. The positions of the parts under excessive pressures, and during underspeed conditions will be more fully described in the operation of this embodiment.

Secured to an end of the axle 117, as by a key 193, is a friction brake drum 194. As may be seen from Figure 6, a brake band 195, lined with a brake lining 196, is adapted to engage the periphery of this brake drum. For operating the brake band 195 into and out of engagement with the brake drum 194, there is provided the aforementioned brake cylinder 161. This brake cylinder is provided with a diaphragm 197 urged toward the left by a spring 198, the spring being of sufficient strength to cause engagement of the brake band 195 with the drum 194 with force great enough to brake the axle associated therewith. When the diaphragm 197 moves to the left under force of the spring 198, a stem 199 secured to the diaphragm rotates a lever 200 secured to a shaft 201 in a counterclockwise direction. The shaft 201 in turn rotates a dog 202 secured thereto, which dog actuates the brake band 195 into engagement with the drum 194 through links 203.

For preventing engagement of the brake band 195 with the brake drum 194 when the hydropneumatic brake device is effective, there is provided a lock out piston 205. The lock out piston 205 is disposed in a piston chamber 206, and the upper end of the piston engages the end of a lever 207 integral with the aforementioned lever 200, a packing element 208 being interposed between the piston 205 and the end of the lever 207. Below the piston is disposed a disc type valve 209 which is urged toward a seat 210 by a spring 211. The disc valve 209 is provided with a restricted port 212, for a purpose which will appear presently.

The shaft or axle 117 may form a part of the vehicle axle, as heretofore indicated in Figure 3, or if the vehicle axle is driven by a motor, the shaft 117 may be coupled to the vehicle motor in the manner shown in Figure 5. The shaft may then be rotatably disposed in the casing 110 through ball bearings 215, and may have secured thereto a pinion 216 adapted to mesh with a gear 217 secured to a vehicle axle 218 associated with two vehicle wheels 220. The gear 217 is suitably coupled to a driving motor 222, and the casing 110 may be provided with a bracket portion 223 suitably secured to the frame of the driving motor 222, as by bolts 224.

When thus associated with a vehicle axle, the operation of this embodiment of my invention is as follows:

When the train is running the brake pipe 163 is maintained charged to a predetermined pressure. Chamber 160 in brake cylinder 161, and brake pipe chamber 155 in the discharge control mechanism are both therefore charged to brake pipe pressure. The parts of the brake device will therefore be in the release position shown in Figure 4. The rotating parts will be lubricated in release position by flow of oil through a restricted port 221, as described in connection with the embodiment of Figure 1. Return flow to the reservoir 140 will be past unseated discharge valve 150.

If it is desired to effect a service application of the brakes, a reduction in brake pipe pressure is made in the usual manner according to the degree of braking desired. The pressure in chambers 160 and 155 will accordingly be reduced. When the pressure in chamber 155 is reduced, diaphragm 154 will move to the left and discharge valve 150 will be seated with a pressure exerted thereon corresponding to the differential of pressure between that exerted by the spring 156 and that from chamber 155. At the same time, supply valve 166 will be seated and release valve 167 unseated, so that chamber 147 will be vented to the atmosphere and spring 148 will unseat cut-off valve 143.

Assuming the shaft 117 and rotor 113 to be rotating in a clockwise direction, oil will flow from the reservoir 140, past the unseated cut-off valve 143, to supply chamber 136. The suction due to the rotation of the rotor 113 will cause the check valve 135 to unseat and oil will then flow from the supply chamber 136 to either chamber 130 or 132, whichever is adjacent the lower cylinder port 133, and the oil thus admitted at the lower cylinder port 133 will be carried toward the upper cylinder port 134 and pressure exerted thereon, as before described in connection with Figure 1.

This pressure of course acts upon the area of the discharge valve 150 within the seat 151, and as soon as the pressure overcomes that exerted on the discharge valve, the valve will unseat and permit the flow of oil back to the reservoir 140. The back pressure thus exerted on the rotor blades 120 will produce a retarding effect on the shaft 117 and consequently on the vehicle wheels 220. It will thus be apparent that the braking effect produced will be proportional to brake pipe reduction, as described in connection with the embodiment shown in Figure 1, and that the rate of retardation thus produced due to the hydro-pneumatic brake will remain constant over the greater part of the deceleration period so long as all wheels roll at normal speed, decreasing however to zero as the vehicle comes to a stop.

Now when oil flows from the cylinder 112 into the chamber 172, it also flows by way of passage 225 to piston chamber 206, unseating the disc valve 209, and flowing past the unseated valve to exert an upward pressure on the lock out piston 205. Above a chosen value, the pressure thus acting on the lock out piston 205 will exert an upward force on the lever 207 great enough to overbalance the opposing force exerted on the lever 200 by the spring 198 due to the reduction of pressure in the chamber 160. When a reduction in brake pipe pressure is initiated, valve 166 will be seated and release valve 167 will be unseated during the initial stage of the reduction, so that fluid will be supplied to the piston chamber 206 before the full brake pipe reduction will have been effected. The parts are so designed that the aforestated chosen value of pressure will be developed in the piston chamber 206 before the friction brake will have been effectively applied. The friction brake will therefore be held in release position so long as the hydro-pneumatic brake is effective in producing an oil pressure above a chosen value.

If it is desired to effect an emergency application of the brakes, the brake pipe pressure is reduced to an emergency value, and diaphragm 154 will move to its extreme left hand position. A pressure will be exerted upon the discharge valve 150 so great as to hold this valve seated and the back pressure exerted on the rotor 113 will then be controlled by release piston 178. Diaphragm 197 will also be urged to the left but the lock out piston 205 will function as described above to hold the friction brake in release position so long as the hydro-pneumatic brake is effective.

Fluid flowing to the passage 225 will flow to the space between the pressure release piston 178 and the underspeed release piston 180, and also to the chamber below the underspeed release valve 182. The pressures acting on either side of the underspeed release valve 182 will therefore be balanced, while the pressure acting on the pressure release piston 178 will be opposed by spring 184.

The pressure exerted on the under side of the pressure release piston 178 will move the piston far enough upwardly to establish communication between the passage 225 and a passage 226, by way of ports 227. The ports 227 are designed to take care of the additional flow of oil resulting from an emergency application at high speeds.

As the valve 178 moves upwardly, the underspeed release piston 180 follows the valve, due to the compression of its spring 192 and equalization of pressures on either side through the aperture 177, but the underspeed release valve 182 remains substantially in the position shown, due to the balanced pressures on either side thereof. The upward movement of the piston 180 is slow enough to permit oil to pass from passage 225 through the aperture 177 in stem 190 into the chamber between the piston 180 and the valve 182, so that when equalization of pressure takes place there virtually exists a solid medium between the piston 180 and the valve 182.

If the track conditions should suddenly change so that there is a decrease in adhesion between wheels and rails, then the speed of the vehicle wheels will suddenly decrease and the pressure exerted in chamber 172 will likewise decrease. This sudden decrease of pressure causes the valve 178 to quickly move downwardly, and in so moving the piston 180 is also moved downwardly. The column of oil trapped between the piston 180 and the valve 182 now causes the valve 182 to be actuated downwardly according to the movement of the piston 180, because the reset port 191 is of such a dimension as to permit passage of oil therethrough at a slow rate only. Therefore, the underspeed release valve 182 will move downwardly far enough to establish a by-pass communication between passage 225 and passage 226, by way of large ports 230, which register with ports 231 in the valve 182. Oil may therefore freely flow from the chamber 172 back to the reservoir 140, through the by-pass communication described, and this sudden reduction in pressure in chamber 172 will permit the rotor 113 to pick up speed.

The reset port 191 will in a very short time release enough of the column of oil between the piston 180 and valve 182, so that within a short predetermined length of time these parts will assume their normal relative positions, and the braking effect on the rotor immediately restored, so that the stop distance will not be unduly lengthened.

When the pressure is suddenly reduced in the chamber 172 and passage 225, the lock out piston 205 is prevented from immediately moving downwardly, due to the slow release of the oil from the chamber above the disc valve 209 through the restricted port 212. By the time the pressure on piston 205 is released sufficiently for the piston to begin to move downwardly, the rotor 113 will have picked up and pressure again restored in chamber 172 and passage 225.

If as rotor 113 picks up speed, slipping of the wheels should again occur, the cycle just described will be repeated, and will continue until the adhesion between wheels and rails increases sufficiently, or until the speed of the vehicle has decreased so that the pressure exerted on the oil by the rotor will produce a braking effect permitted by the adhesion between wheels and rails.

If the decrease of pressure in chamber 172 and passage 225 takes place at a slow rate the reset port 191 will permit escape of the oil below piston 180 fast enough to prevent movement of piston valve 182.

As the speed of the vehicle decreases, following either a service application or an emergency application of the brakes, the pressure exerted on the oil in chamber 172 will diminish to the point where both valves 150 and 178 are closed and the oil flows through the by-pass port 232 only. At or slightly before the vehicle comes to a stop, the pressure on the lock out piston 205 will have reduced sufficiently for the lever 207 to move downwardly and permit the friction brake to be applied. As the vehicle comes to a stop, therefore, it will be held at rest due to application of the friction brake, although the hydro-pneumatic brake may be adequate to actually bring the vehicle to a stop. At the end of the stop the degree of application of the friction brake may be varied by varying brake pipe pressure, as desired.

If at any time it is desired to effect a release of either or both of the hydro-pneumatic brake and the friction brake, the brake pipe pressure is restored in the usual manner. The parts will then return to the position shown in Figure 4, the brake band 195 will be actuated out of engagement with the brake drum 194, and the only oil which flows into the cylinder 112 will be the small amount by way of the by-pass supply port 221 for lubricating purposes.

In order that all of the oil entering either of the chambers 130 or 132 from one of the cylinder ports 133 or 134 shall be discharged through the other cylinder port, slip grooves 233 and 234 have been provided. From the manner in which these slip grooves have been shown in Figure 4, it will be obvious that as the oil is forced out through the cylinder port adjacent to the groove the groove functions to prevent trapping of oil in the space forward of the port.

If the rotation of axle 117 and rotor 113 is in a counterclockwise direction, the suction created when rotor 113 is rotated will unseat the check valve 137, and oil will flow past this unseated valve through the passage 138 to the upper cylinder port 134. From this port the flow will be to whichever of chambers 130 and 132 is adjacent the port and hence carried to the lower cylinder port 133 and forced through passage 176 upwardly to the ball check valve chamber 173, where the ball check valve 175 is actuated to its extreme right hand position. Thereafter the action of the hydro-pneumatic brake device will be the same as heretofore described for clockwise rotation of the rotor 113.

While I have described my invention with particular reference to two specific embodiments thereof, it is to be understood that I do not intend to be limited to these two embodiments or otherwise than by the spirit and scope of the appended claims.

Having now described my invention, what I claim as new and desire to secure by Letters Patent, is:

1. In a vehicle brake system, in combination, a brake pipe, a brake device having a chamber and a rotor operable to impel a fluid into said chamber, means for establishing a communication leading from said chamber, and means for controlling the flow of fluid from said chamber through said communication in accordance with reductions in brake pipe pressure, whereby said brake device is caused to produce a braking effect corresponding to brake pipe reductions.

2. In a vehicle brake system, in combination, a brake device having a chamber and a rotor operable to impel a fluid into said chamber under pressure, a valve subject on one side to pressure from said chamber and subject on the other side to pressure of a spring for controlling the release of said fluid from said chamber, a brake pipe, and means for controlling the pressure exerted on said valve by said spring in accordance with reductions in brake pipe pressure.

3. In a vehicle brake system, in combination, a brake device having a chamber and a rotor operable to impel a fluid into said chamber under pressure, a valve subject on one side to pressure from said chamber and on the other side to pressure from a spring, means for establishing a by-pass communication around said valve, a by-pass valve for controlling said by-pass communication, a brake pipe, and means for controlling operation of said by-pass valve and the pressure on said spring in accordance with reductions in brake pipe pressure.

4. In a vehicle brake system, in combination, a brake device having a chamber and a rotor operable to impel fluid into said chamber under pressure, a main valve for controlling the release of fluid from said chamber and adapted to be opened by pressure of fluid from said chamber, a by-pass valve controlling a by-pass communication around said main valve and operable by pressure from said chamber to partially close said by-pass communication, a control chamber normally subject to fluid under pressure adapted to be varied according to desired degrees of braking, and means for controlling opening of said main valve and closing of said by-pass valve according to the pressure of fluid in said control chamber.

5. In a vehicle brake system, in combination, a brake device having a rotor and a cylinder eccentric thereto coacting to act upon a fluid supplied to said cylinder to produce a braking effect, a valve controlling the supply of fluid to said cylinder, a second valve controlling the discharge of fluid from said cylinder, a movable abutment, means for controlling movement of said abutment, and means for controlling operation of both of said valves in response to movement of said abutment.

6. In a vehicle brake system, in combination, a brake device having a rotor and a cylinder eccentric thereto coacting to act upon a fluid supplied to said cylinder to produce a braking effect, a first valve controlling the supply of fluid to said cylinder, means for holding said first valve normally closed, a second valve for controlling the discharge of fluid from said cylinder, means for urging said second valve closed with variable pressures, a brake pipe, means responsive to a reduction in brake pipe pressure for causing said first valve to open, and means also responsive to a reduction in brake pipe pressure for varying the pressure urging said second valve closed.

7. In a vehicle brake system, in combination, a brake device having a rotor and a cylinder eccentric thereto coacting to operate upon a fluid supplied to said cylinder to produce a braking effect, a first valve for controlling the supply of fluid to said cylinder, a brake pipe, means operable when said brake pipe is charged for holding said first valve seated, a second valve for controlling the discharge of fluid from said cylinder, spring means for urging said second valve toward closed position, a by-pass valve for controlling a by-pass communication around said second valve, means responsive to a reduction in brake pipe pressure for causing said first valve to open, means responsive to a reduction in brake pipe pressure for increasing the tension on said spring means, and means also responsive to a reduction in brake pipe pressure for controlling operation of said by-pass valve.

8. In a vehicle brake system, in combination, a brake device having a rotor and a cylinder coacting to operate upon a fluid supplied to said cylinder to produce a braking effect, a first port and a second port opening into said cylinder, a source of fluid supply, means for establishing one communication from said source to said first port and another communication from said source to said second port, a valve device in each of said communications operable to permit flow of fluid toward said ports and operable to prevent flow of fluid from said ports toward said source, means for establishing a communication from said two ports through which fluid is discharged from said cylinder, two discharge valves controlling said communication, and a valve device operable to render one of said discharge valves effective in controlling said communication when said rotor is rotating in a clockwise direction and operable to render the other of said discharge valves effective when said rotor is rotating in a counterclockwise direction.

9. In a vehicle brake system, in combination, a brake device having a rotor and a cylinder eccentric thereto coacting with said rotor to operate upon a fluid to produce a braking effect, means for controlling the supply of fluid to said cylinder, means for controlling the discharge of fluid from said cylinder, a brake pipe, means for controlling said second means according to reductions in brake pipe pressure, and means operated upon a predetermined pressure of the fluid discharged from said cylinder for releasing fluid from said cylinder independently of said second means.

10. In a vehicle brake system, in combination, a brake device having a rotor and a cylinder eccentric thereto coacting to operate upon a fluid supplied to said cylinder to produce a braking effect, means for controlling the supply of fluid to said cylinder, a valve for controlling the discharge of fluid from said cylinder, a brake pipe, means for urging said valve toward a closed position with a force corresponding to reductions in brake pipe pressure, and a second valve subject on one side to pressure of fluid discharged from said cylinder and subject on the other side to pressure of a spring and being operable upon a predetermined pressure of fluid discharged from said cylinder to establish a communication by-passing fluid around said first valve.

11. In a vehicle brake system, in combination, a brake device having a rotor disposed in a cylinder eccentric to said rotor and coacting therewith to operate upon a fluid supplied to said cylinder to produce a braking effect, means for supplying fluid to said cylinder, a valve for controlling the discharge of fluid from said cylinder, a brake pipe, means for urging said valve toward closed position with a force corresponding to reductions in brake pipe pressure, means for by passing fluid around said valve at one rate when the pressure exerted on said fluid exceeds a predetermined value, and means for by-passing fluid around said valve at a greater rate upon a predetermined decrease of pressure exerted on said fluid.

12. In a vehicle brake system, in combination, a brake device having a rotor disposed in a cylinder eccentric to said rotor and coacting with said rotor to exert pressure upon a fluid to produce a braking effect, a brake pipe, means for controlling the pressure exerted upon said fluid according to reductions in brake pipe pressure, a valve operable at a predetermined pressure exerted on said fluid for releasing fluid from said cylinder at one rate, and means operated upon a sudden decrease in pressure exerted on said fluid due to a decrease in speed of rotation of said rotor for releasing fluid from said cylinder at a greater rate.

13. In a vehicle brake system, in combination, a brake device having a rotor and a cylinder coacting to operate upon a fluid to produce a braking effect, a friction brake device operable to produce a friction braking effect, a movable abutment, means for controlling movement of said abutment, means for causing said first brake device to produce a braking effect according to movement of said abutment, means for causing said friction brake device to produce a friction braking effect, and means responsive to operation of said first brake device for rendering said friction brake device ineffective and operable when said first brake device decreases in effectivenes for cutting said friction brake device into action.

14. In a vehicle brake system, in combination, a fluid brake device having a rotor and a cylinder coacting to operate upon a fluid to produce a braking effect, a friction brake device operable to produce a friction braking effect, a brake pipe, means responsive to reductions in brake pipe pressure for effecting operation of both of said brake devices, and means responsive to the pressure of said fluid for rendering said friction brake device ineffective to produce a braking effect.

15. In a vehicle brake system, in combination, a fluid brake device operating upon a fluid to produce a braking effect, a friction brake device for producing a friction braking effect, means operable to effect an application of both of said brake devices to a like degree, means for preventing an application of the friction brake device while the fluid brake device is effective, means operable upon a decrease in the braking effect of the fluid brake device due to slipping of the vehicle wheels for reducing the effectiveness of the fluid brake device, and means for delaying cutting in of the friction brake device upon decrease in effectiveness of the fluid brake device for a predetermined interval of time.

16. In a vehicle brake system, in combination, a brake device having a rotor and a cylinder eccentric to said rotor coacting to operate upon a fluid supplied to said cylinder to produce a braking effect, a source of fluid supply, means for supplying fluid from said source to said cylinder, a discharge chamber, a valve controlling the discharge of fluid from said cylinder to said discharge chamber, a brake pipe, means for urging said discharge valve toward closed position with a force corresponding to reductions in brake pipe pressure, and cooling means for conducting fluid from said discharge chamber to said source of supply.

17. In a vehicle brake system, in combination, a brake device having a chamber and means operated according to the speed of vehicle wheels for impelling a fluid into said chamber under pressure, means for controlling the release of fluid from said chamber according to a desired braking effect, means for establishing a communication adapted to release fluid from said chamber at one rate, means for establishing a second communication adapted to release fluid from said chamber at a greater rate, a first valve normally holding said first communication closed and operable upon a predetermined pressure in said chamber for opening said first communication, a second valve normally holding said second communication closed, and means associated with said two valves operable to hold said second valve closed when said first valve is opened and operable to open said second valve for a predetermined length of time when said first valve is closed.

18. In a vehicle brake system, in combination, a brake device having a chamber and a rotor operable to impel a fluid into said chamber, means for establishing a communication leading from said chamber, a pipe in which the pressure of fluid supplied thereto is varied, and means for controlling the flow of fluid from said chamber through said communication in accordance with the variations of pressure in said pipe, whereby said brake device is caused to produce a braking effect corresponding to said variations in pressure.

19. In a vehicle brake system, in combination, a brake device having a cylinder and a rotor therein coacting to act upon a fluid supplied to said cylinder to produce a braking effect, a valve controlling the flow of fluid discharged from said chamber, a pipe normally charged with fluid under pressure, and means for controlling said valve according to reductions of pressure in said pipe.

20. In a vehicle brake system, in combination, a brake device having a rotor and a cylinder coacting to operate upon a fluid to produce a braking effect, means for controlling the supply of fluid to said cylinder, means for controlling the discharge of fluid from said cylinder, a pipe adapted to have the pressure of fluid supplied thereto varied according to desired degrees of braking, means for controlling said second means according to variations of pressure in said pipe, and means operated upon a predetermined pressure of the fluid discharged from said cylinder for releasing fluid from said cylinder independently of said second means.

BURTON S. AIKMAN.